United States Patent
Hase

(10) Patent No.: US 9,422,116 B1
(45) Date of Patent: Aug. 23, 2016

(54) TIERED COMMUNICATION SCHEME TO EMBED CONVEYOR ZPA AND ROUTING CONTROL

(71) Applicant: Karl E. Hase, Corvallis, OR (US)

(72) Inventor: Karl E. Hase, Corvallis, OR (US)

( * ) Notice: Subject to any disclaimer, the term of this patent is extended or adjusted under 35 U.S.C. 154(b) by 0 days.

(21) Appl. No.: 14/736,041

(22) Filed: Jun. 10, 2015

(51) Int. Cl.
- *G06F 7/00* (2006.01)
- *B65G 43/10* (2006.01)
- *B65G 43/08* (2006.01)

(52) U.S. Cl.
CPC .............. *B65G 43/10* (2013.01); *B65G 43/08* (2013.01); *B65G 2811/0673* (2013.01)

(58) Field of Classification Search
None
See application file for complete search history.

(56) References Cited

U.S. PATENT DOCUMENTS

| | | |
|---|---|---|
| 7,104,395 B2 | 9/2006 | Brown et al. |
| 8,868,732 B2 | 10/2014 | Smith et al. |
| 2014/0129026 A1* | 5/2014 | Scholler et al. ....... B65G 47/52 700/230 |
| 2015/0001137 A1* | 1/2015 | Layne et al. ............. B07C 5/36 209/552 |
| 2015/0041281 A1* | 2/2015 | Ghezal .................. G06M 1/101 198/340 |

\* cited by examiner

*Primary Examiner* — Yolanda Cumbess
(74) *Attorney, Agent, or Firm* — Stewart Myers

(57) ABSTRACT

A two-level hierarchical communication architecture for segmented material conveyors having separate motor zones for sensing and control is presented herein. The architecture utilizes peer-to-peer serial communications among a plurality of motor zones to coordinate the article handling actions of those zones. Specific communications connectivity and message content schemes are used to better provide ZPA functionality that is performed in prior art conveyors by discrete contact-logic single bit "look-ahead" wiring. Additional features of the present invention include variations on placements of one or more barcode, tag reader or article presence sensors; a variable speed ZPA scheme; and a token-passing scheme for relaying pre-arranged article routing decisions among zone controllers.

6 Claims, 3 Drawing Sheets

TIERED COMMUNICATION SCHEME TO EMBED CONVEYOR ZPA AND ROUTING CONTROL

FIELD OF THE INVENTION

The invention relates to segmented electromechanical material conveyor systems, and in particular to a system suitable for moving articles along a certain conveyor path, especially with identifier tags used to differentiate articles in conjunction with article presence sensors designed to detect passage of each article from segment to segment. The invention holds that each segment embeds its own microcontroller to run its motor(s), which communicates on a serial bus with the microcontrollers of other segments, and to a supervisory controller via an industrial fieldbus network adapter also on that serial bus. The invention includes a scheme of general and specific information communicated between segment microcontrollers to accomplish the article routing decisions of a supervisory controller with a minimum of fieldbus activity.

BACKGROUND OF THE INVENTION

Embodiments found within the prior art generally utilize handshaking between conveyor segments (aka zones) as disclosed in U.S. Pat. Nos. 5,862,907; 6,860,381; 7,905,345; 6,035,999; 6,244,421; 6,253,906. These embodiments use a single relay logic contact signal that is sent from a conveyor segment "n" to an upstream segment relay logic gate. This single on/off bit signal state is either "clear-to-send" when zone "n" is empty and ready to accept an article from zone "n−1", or else it is an "inhibit" state to prevent an article from being released by "n−1" because "n" is not clear and ready.

If and when the direction of article flow is reversed, a second relay logic contact signal is required, in the opposite direction (from segment "n−1" to "n") to serve a similar flow control function.

Additionally, or instead, a direct fieldbus network interface connection (NIC) may be provided to connect each drive (motor controller) of a segment or group of segments sharing a drive, such as found in the disclosures of U.S. Pat. Nos. 8,587,245; 8,248,009; 5,955,859; and U.S. Pat. App. No. 2005/0094343.

Importantly, the prior art does not disclose segments that "talk to each other" intelligently in order to pass more than a single on/off inhibit bit of information from one segment to the next. In the latter case, the fieldbus can carry broader information content, but it is not being used for peer-to-peer exchange of data among neighboring segments, but rather only for separately reporting to a common supervisory PLC. In the former case, the peer-to-peer exchange is only of a single state like a stop light.

In a third variation, as disclosed in U.S. Pat. Nos. 7,996,104; 5,771,174; 8,761,937; 8,885,516; U.S. Pat. App. No. 2002/0107582; and EP 2511780, each drive's NIC can directly address messages to its peer neighbors, providing a mechanism to support many schemes of article traffic control communications. However, no actual inter-zone communication scheme for embedding conveyor article routing control has been described in these or any other known disclosures.

Furthermore, the use of paper "traveler" routing slips to accompany conveyed articles of work-in-progress is common in factories worldwide but no electronic equivalent, carried by peer-to-peer messages on a serial or fieldbus network, has been described in any known disclosure. Reference U.S. Pat. App. Nos. 2006/0041628; 2010/0036522; and U.S. Pat. Nos. 6,470,227; 8,069,071.

Therefore, there is a need for an electronic peer-to-peer message serving as a "traveler" or "routing slip" for conveyor routing control, whether carried on a serial or a fieldbus or other network connection, whether public or private.

BRIEF SUMMARY OF THE INVENTION

A two-level hierarchical communication architecture for segmented material conveyors, having separate motor zones for sensing and control, is presented as new art, to better facilitate article routing control by a central supervisory controller, by certain schemes for communication among the zone controllers.

Peer-to-peer serial communications among a plurality of motor zones, to coordinate the article handling actions of those zones, sharing as a group one connection to a factory fieldbus network on which article routing commands originate, is presented as new art to better facilitate conveyor factory integration. The factory public layer and serial private layer together constitute a hierarchical communication architecture that enables the delegation of routing actions to minimize the communication burden on the supervisory machine.

Specific communications connectivity and message content schemes are presented as new art, to better provide the zero-pressure-accumulation (ZPA) functionality now familiar in conveyors but performed by discrete contact-logic single bit "look-ahead" wiring. Variations on placements of one or more barcode or other tag readers and article presence sensors are presented as further new art to better support ZPA and article routing control.

A variable speed ZPA scheme which leverages this new connectivity is presented as further new art, to slow articles rather than completely stop and start them, as slowing and resuming can be more gentle and more expedient than fully stopping and starting any load.

A token-passing scheme which leverages this new connectivity for relaying pre-arranged article routing decisions among zone controllers, as a "Routing Slip" to accompany each article conveyed, is presented as further new art to better provide reliable execution of routing control without time-critical reliance on fieldbus communications.

DETAILED DESCRIPTION OF THE INVENTION

Figure 1:
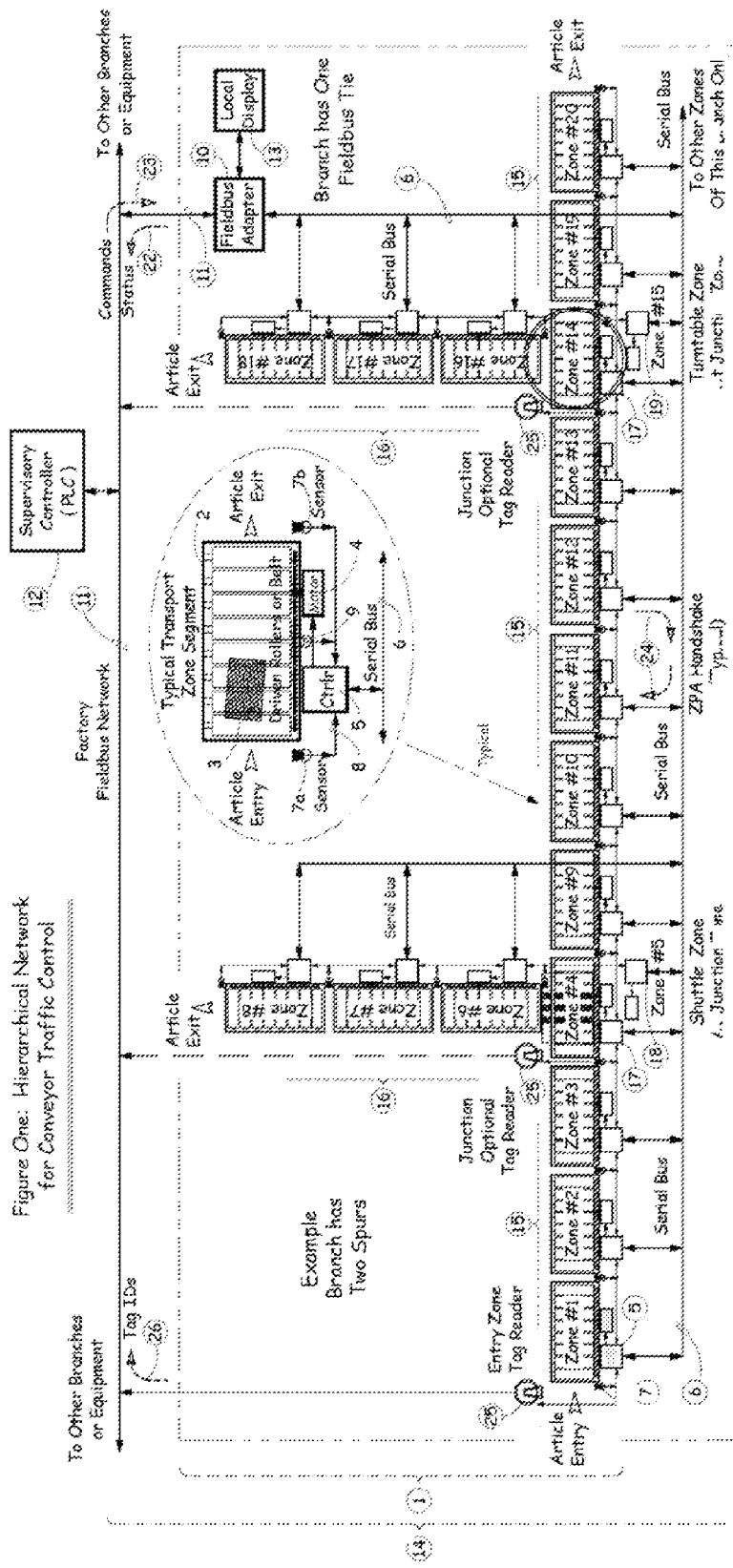
FIG. 1 is diagram showing a hierarchical network for conveyor traffic control as according to one embodiment of the present invention.
Figure 2:
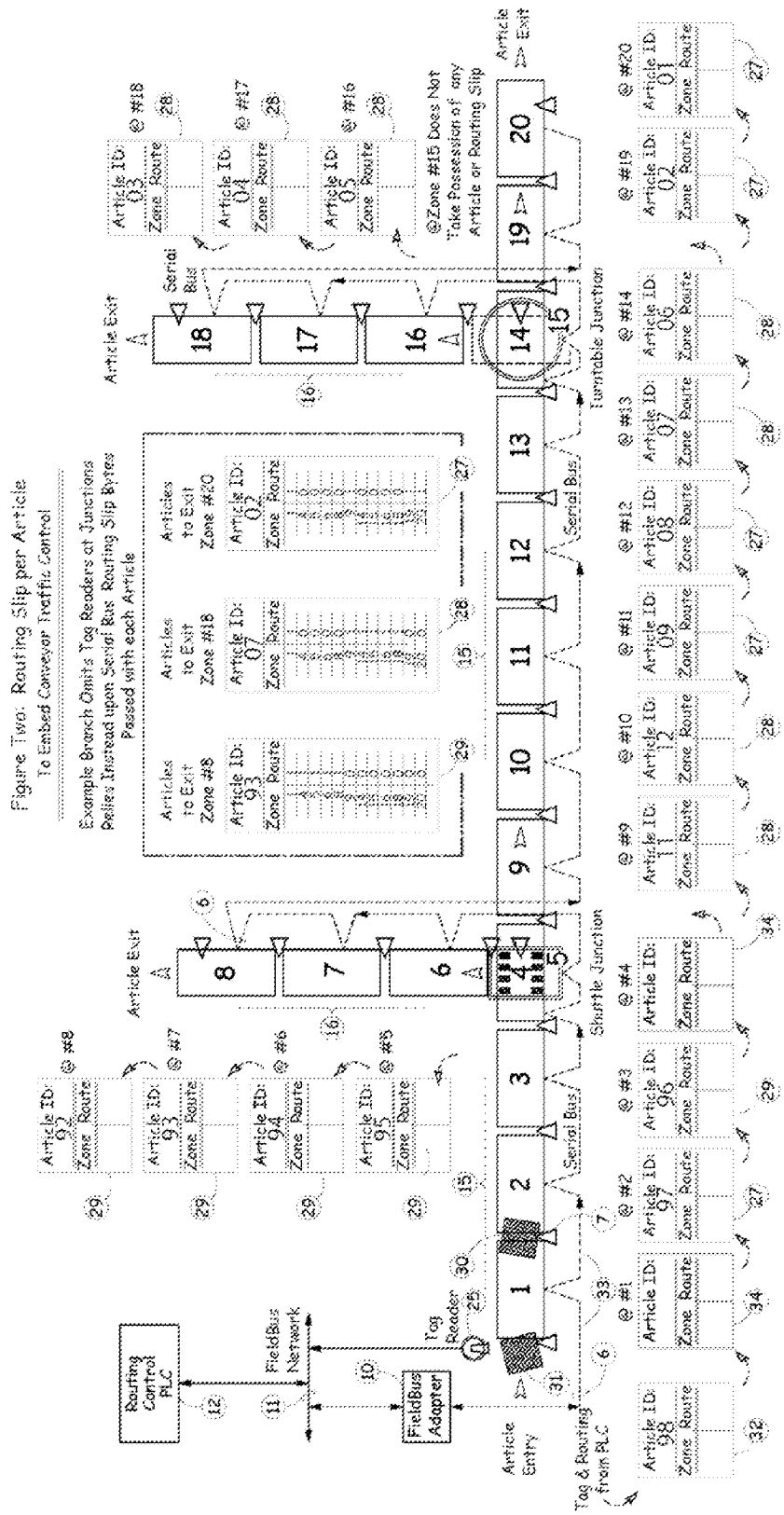
FIG. 2 is diagram showing a routing slip per article to embed conveyor traffic control as according to one embodiment of the present invention.
Figure 3:
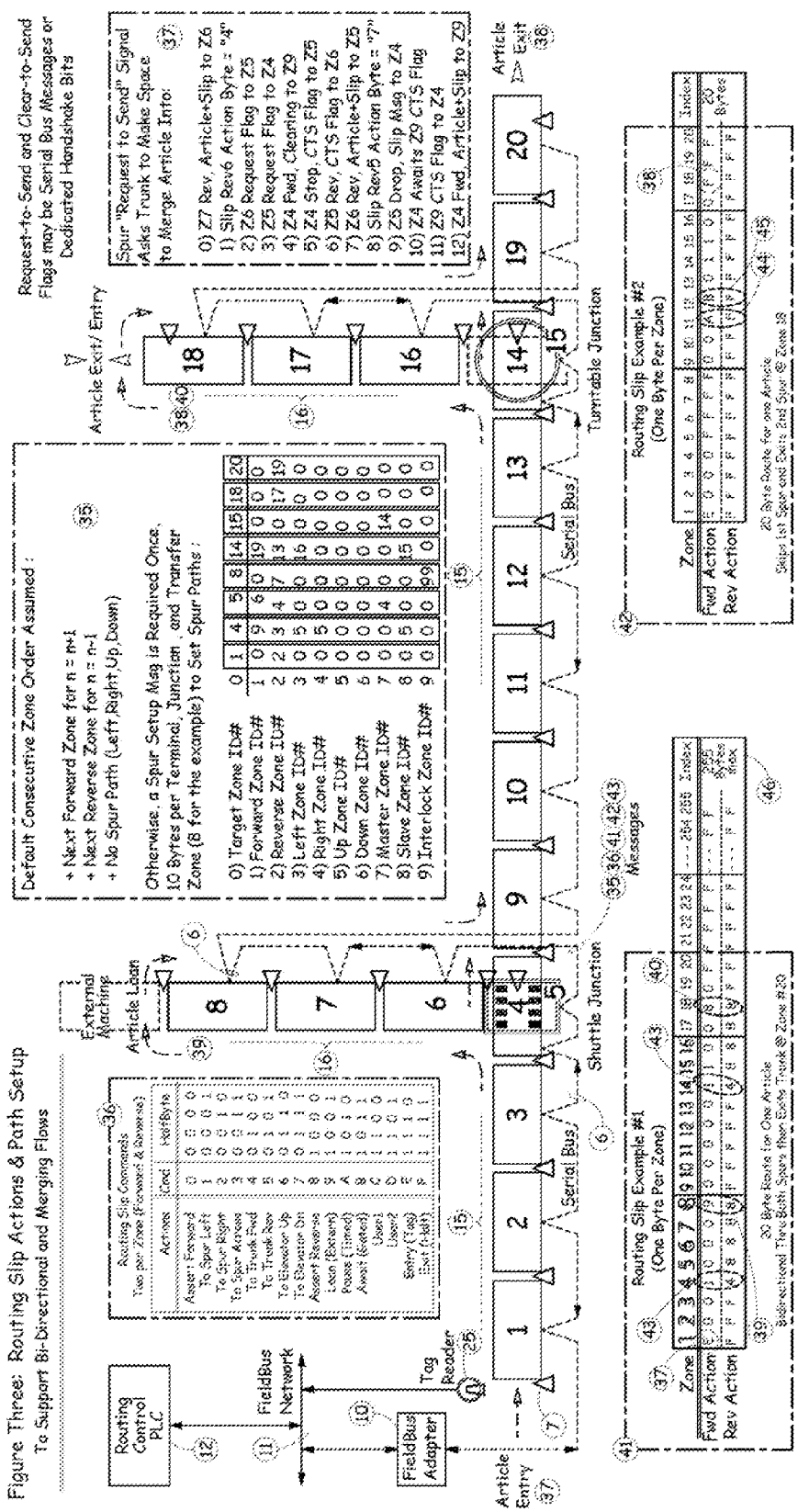
FIG. 3 is diagram showing routing slip actions and path setup to support bi-directional and merging flows as according to one embodiment of the present invention.

Referring now to FIGS. 1-3 that will be discussed together, a conveyor system (1) includes independently motorized transport segments (2) arranged to move articles (3) along a certain conveyor path consisting of a plurality of such drive segments, each comprised of friction or toothed belts, rollers, bands, or other transport mechanism driven by motor(s) (4) having controller(s) called Zones (5), that are interconnected by a bidirectional communication Serial Bus (6) such as I2C, SPI, RS232, USB, or any standard or proprietary physical and/or protocol serial design.

A conveyor segment may consist of a plurality of rollers per motor and/or a plurality of motors per controller and/or a plurality of controllers, but for clarity herein a Zone is a single controller for a single segment at which a single article (object being transported or OBT) can be singulated to stop between a single pair of photo-eye sensors (7), one at the entry (7a) and one at the exit (7b) of the Zone's segment.

Each Zone controller includes nominally two signal inputs (8) for article presence sensors positioned at either of the two ends of the segment to detect an article passing onto or off of the segment end to/from another segment or other equipment piece. Any two adjoining segments may share a single article presence sensor at their boundary for economy, or each may embed its own sensor for convenience, each typically a retro-reflective or thru-beam photo-eye.

The two sensors can detect the four distinct states of an article's passage: Zone Empty, Article At Entry Sensor, Article Between Sensors, Article At Exit Sensor, and an optional third sensor (9), centered in the segment will allow the Zone to positively distinguish Zone Empty from Article Between Sensors.

A fieldbus network adapter (10) gateway to the Serial Bus shared by Zones of a Branch may be built-into any one Zone controller, or may be a standalone device, to permit connection to an industrial fieldbus network (11) such as Mod-Bus, DeviceNet, Profibus, ProfiNet, Ethernet/IP, EtherCat, Ethernet, PowerLink, or similar, to permit conveyor control and monitoring by a Supervisory entity (12) such as a PLC or PC. The fieldbus gateway unit is a logical place to also provide a local display (13) for diagnostics and setup.

Zones so interconnected altogether comprise a two-layer communications network (14) for a conveyor Branch defined to include one Trunk (15) mainline comprised of a plurality of Transport Zones, and one or more Spurs (16) each comprised of one or more Transport Zones to or from which articles can be diverted from or to the Trunk (or another Spur) at a Junction Zone (17), by a Shuttle (18) or Turntable (19) or Elevator (20, not shown) any of which is co-located at the Junction Zone, and whose controller is separately addressed as a Zone on the Branch Serial Bus.

By virtue of its article sensors, each Zone can deliver status messages (22) signaling each state of passage of an article, via the Serial Bus then fieldbus network to a Supervisory PLC which is thus able to track articles as they move on the Branch, and in response, deliver commands (23) back to Zones via the network and Serial Bus, to effect the routing of articles to different destinations on the Branch.

Zero Pressure Accumulation (ZPA) coordination among segments may be accomplished by handshake message passing (24) between adjoining Zones using the Serial Bus, rather than by discrete relay-logic handshake lines of the prior art (U.S. Pat. No. 6,244,421), consisting at a minimum of a Clear-To-Send message sent to the next upstream Zone from a Zone that is becoming empty as its exit sensor detects its article leaving.

By sending an integer value proportional to a Zone's speed plus an offset, instead of just a go/no-go bit, in each Clear-To-Send message to the next upstream Zone, to which to set its speed then relay it in turn upstream if empty itself, a variable speed ZPA scheme results in which articles slow as they bunch up behind a stoppage, but do not necessarily come to a complete stop and wait. Each Zone would use the same adjustments of proportional gain "m" and offset "b" in the speed calculation Vnext=m*Vprev+b.

When the articles to be conveyed are distinct and uniquely identifiable by Barcode or other ID Tag markings rather than being identical and interchangeable, a Tag Reader (25) must be located at (each of) the Branch Entry Zone(s) to communicate each article's Tag ID number (26) to a Supervisory PLC via the fieldbus. The Supervisory PLC must decide to which of the Branch Exit Zones each article is to be routed, and communicate this back to the Branch via the fieldbus network either at once, as individual articles are identified as each enters the Branch, or later as each arrives at a Junction Zone, where such routing decisions must be applied.

DESCRIPTION OF EMBODIMENTS

In one implementation, a Tag Reader is provided at each Junction Zone to supply a Tag ID to the Supervisory Controller (typically a PLC) via the fieldbus network as each article arrives and a decision must be made by the PLC which then sends a command to the Junction Zone to pass the article onward, or to the Shuttle or Turntable Zone to divert the article onto (one of) the adjoining Spur(s).

In one economy implementation, only one Tag Reader is applied at or upstream of the Branch Entry Zone #1, and a constant stream of article presence status messages are passed to the Supervisory Controller from all Zones via the Serial Bus then the fieldbus network, by which the PLC makes routing decisions on the fly and sends routing commands in response. In this case, each Junction Zone holds each article long enough to allow a command message from the Supervisory Controller via the fieldbus then the Serial Bus, to direct the associated Shuttle Zone to Transfer its article onto a Spur, or else to release it onward to the next downstream Zone.

To track individual articles as they flow non-stop through the Zones between Entry and Transfer Exit, the PLC depends upon time-critical status messages from those Zones to tell it of each article presence sensor pulse. As this constitutes ever a race between messages and article motion, the reliability is contingent on slow enough article motion and a fast enough Status+Command message round trip.

In a favored economy implementation, only one Tag Reader is applied at the Branch Entry Zone, and for each article accepted onto the Branch, that Entry Zone receives a few Routing Bytes as a "Traveler" or "Routing Slip" from the Supervisory Controller, to thereafter direct that article's route by indicating, at a minimum, those Junction and Transfer Zone(s) by whose actions the article is to be diverted onto a Spur.

As each article's passage from segment to segment is detected by the article presence sensor(s) between segments, the corresponding Routing Slip bytes are also passed from Zone to Zone, without involving the Supervisory PLC. When an article arrives at each Junction Zone, therefore, the associated Routing Slip bytes dictate if the article is to stop, and whether it is then to be transferred to a Spur or sent onward. Each Zone to which an article may travel from a Junction Zone must be identified. At an Operator Station, the Routing Slip bytes dictate if the article is to be removed from the conveyor or not. At an Exit Zone, the Routing Slip bytes can validate that an article has arrived at the correct destination.

FIG. 2 shows one scheme of Routing Slip bytes residing in each Zone controller for the same conveyor Branch depicted in FIG. 1, in which a minimum Routing Slip embodiment consists of one Boolean flag for each possible Exit Zone, each Junction Zone, each Transfer Zone, and each of the Zones fed from a Junction by a Transfer unit. Each Routing Slip includes a rendition of the Tag ID of the article for which it stands, shown as a double integer (four bytes) in this example.

The first article to have entered the FIG. 2 Branch, having an example Tag ID value of 65535-10001, has reached the Exit Zone #20 and will be manually removed from the Branch there, as denoted by the "1" flag at the last slot in its Routing Slip (27). The article now at Zone #19 has also been routed to exit via Zone #20 next. However the article at the preceding Zone #14 has a Routing Slip (28) with a "1" flag that tells Zone #14 to stop that article, and a "1" flag to tell Turntable Zone #15 (which carries the Zone #14 segment) to rotate the article in order to send it onto Zone #16 so that it will travel to Exit Zone #18 as flagged by a "1" also. The articles at Zones #16, #17, and #18 have been routed by a similar Routing Slip (28) directing them toward Exit Zone #18, as will be the article shown at Zone #13.

The FIG. 2 Routing Slip (29) for the article ID 65535-10096 at Zone #3, however, dictates that it will be routed to Exit Zone #8, as it will be stopped when it reaches Junction Zone #4 where Shuttle Zone #5 will transfer it sideways onto Spur Zone #6. The Routing Slip ID 65535-10095 is shown in transit on Shuttle Zone #5, leaving Zone #4 holding no Routing Slip, since the moment Zone #5 lifted that article off of Zone #4, until the article is sensed leaving Zone #5 and its Routing Slip is sent to Zone #6.

FIG. 2 depicts Entry Zone #1 having just handed off an article (30) to Zone #2, and as also having just received a new infeed article (31), whose Tag ID and disposition info have just arrived (32) from a Supervisory PLC, initiated by the Entry Zone #1 article presence sensor having triggered the Tag Reader. The Routing Slip (27) for the article with example Tag ID 65535-100097 has just been sent in a Routing Message (33) from Zone #1 to Zone #2, leaving Zone #1 with an empty memory spot (34) ready to accept a new article Routing Slip. Each Zone must in fact hold in separate memory an incoming and an outgoing Routing Slip, plus optionally a third for an article between sensors (or at an optional third sensor) for tight ZPA packing of possibly three articles momentarily on any one Zone.

The Routing Slip for each article is sent to the next zone downstream via the Serial Bus upon the leading edge of the article presence sensor between the two zones. A Junction Zone sends each Routing Slip to one of two possible next Zones: either the next downstream Zone, or the co-located Transfer Zone (Shuttle, Turntable, or Elevator) if the associated article is to be diverted to a Spur. The Zone number to which to send the Routing Slip must therefore be known to the Transfer Zone, and the Serial Bus must support a message addressing scheme allowing an arbitrary Zone number as recipient.

Rather than identify all the adjoining Zones of each Transfer Zone in every Routing Slip, a map of those fixed address numbers can be preset into each Transfer Zone by a one-time Setup Message (35) sent by the Supervisory PLC upon power-up, then assumed implicit in the commands of each Routing Slip thereafter, as detailed in FIG. 3. In order to support bi-directional and merging flows, the Route Flag bit of FIG. 2 becomes a Command Byte (36) in FIG. 3 which combines a four-bit Forward Action code and a four-bit Reverse Action code for each Zone, in the Routing Slip for each article.

Bi-directional Spur traffic allows an article to travel down a Spur from the Trunk to the Spur end, then follow Reverse Actions back to the Trunk to rejoin main downstream flow, resuming Forward Actions. A Spur may thus terminate in an Entry Zone (37), or an Exit Zone (38), or an Exit+ReEntry Zone (39), or Rebound Zone (40), which differ only in Command Code ("E" or "F" or "9" or "8" respectively).

A bidirectional Spur or a Spur offering a second Entry Zone requires a merge action at the Spur Junction with the Trunk, whereby Trunk traffic must stop at the Zone upstream of the Junction, leaving the Junction Zone empty to receive an article from the Spur. If the Spur article may be inserted arbitrarily in the Trunk article order, the merge may be accomplished by local handshake alone; otherwise the Spur article must wait, cued at the Spur Zone adjoining the Junction, for a permission command from the Supervisory PLC.

The first Spur of FIG. 3 ends in an external process machine to which Zone #8 can offload an article then accepts it back, retaining its Routing Slip. Such a Spur can have only one article on it at a time; for the same reason, a bi-directional single-lane Trunk is unlikely, whereas a two-lane Trunk will be commonplace. The second Spur of FIG. 3 ends in Zone #18 at which an article may Exit or Rebound to the Trunk, as per Routing Slip Example #1 (41) or Example #2 (42), respectively.

An article assigned Routing Slip Example #1 (41) proceeds Forward to Junction Zone #4 then to Shuttle Zone #5 then to Spur Zone #6, then Zone #7, then Zone #8, where the article's Exit and Re-Entry (per Command Code "9") are signaled by hardwired contacts to handshake with an external machine or manual pushbuttons. Zone #8 Forward Route Command Code "9" implies switching to then follow the Reverse Route which dictates the article return to Zone #7 then Zone #6, which must ask the Trunk to allow the Spur to merge its article into Trunk flow.

On the Serial Bus, a Request-to-Send Message (43) from Zone #6 to Shuttle Zone #5 is relayed to Junction Zone #4 which will reply with Clear-To-Send when it has emptied and is ready to accept the article from Spur Zone #6 via Shuttle Zone #5. Alternately, Request-to-Send and Clear-to-Send may be hardware handshake bits instead of Serial Bus Messages. In either case, whenever both signals are "true," exchanged between any two adjoining Zones, an article will advance.

When the article of FIG. 3 has then moved from Spur Zone #6 to Shuttle Zone #5 to Junction Zone #4, the Reverse Route (Command Code "4") dictates Trunk Forward which Zone #4 remembers is Zone #9 next. Upon a Clear-to-Send from Zone #9, Zone #4 will handoff the article then its Routing Slip to Zone #9. After this article has left Zone #4, the inhibit of the Trunk upstream of Zone #4 will end with a Clear-To-Send Message sent to Zone #3, ending the Merge cycle.

An article assigned Routing Slip Example #2 (42) travels Forward only, skipping the first Spur but diverting onto the second Spur at Junction Zone #14, to exit at Zone #18. This simpler Routing Slip is of the same 20-byte length as that of Example #1. Example #2 features a timed Pause (44) and a gated Await (45) (Command Codes "A" & "B") at Zones #11 & #12, respectively, perhaps to suit an inline inspection camera and an Operator Station, respectively.

Each Routing Slip of FIG. 3 therefore constitutes a compact sequencing script that pre-destines all of the movements of the one article which it accompanies along the conveyor Branch. For a given Branch, every article Routing Slip will be exactly the Branch's total number of Zones in length, a maximum of 255 bytes (46), and 20 bytes in the FIG. 3 examples. Unused bytes in a Routing Slip can be padded with the Exit code "F" that halts an article (38) and requires its manual removal.

The PLC may have cause to change the routing of an article that has already advanced along a Branch, owing to a process outcome or fault event, for which a command to alter a Routing Slip already in play must be relayed from Zone to Zone until it reaches the Zone presently holding the article with that Tag ID, and presumably assign a new Exit Zone for an article which is perhaps past a Spur at which it would then need to turn but no longer can, unless there is a two-lane Trunk for Recycling flow.

Because an article can thus unavoidably arrive at a different Exit Zone than intended, implying manual corrective action, a record might be added to the Routing Slip of which routing steps were obeyed and which could not be obeyed. If the article passes to another Branch or piece of process equipment, its Tag ID (only) may be passed to that other equipment via the Fieldbus Network, initiated by the Exit Zone via the Serial Bus; in lieu of requiring another Tag Reader at that handoff point.

In summary, a cost incentive drives the use of a Serial Bus for peer-to-peer communications within a Branch of perhaps hundreds of Zones, that then share only one fieldbus network adapter bearing a cost premium, but the Serial Bus also allows exchange of ZPA handshake and article routing messages among neighboring Zones to be kept local rather than cluttering the factory fieldbus network, while facilitating reliable article traffic control in this novel manner. A Branch fully occupied with articles will index (shift all articles downstream by one Zone) exactly as often as an article is removed at an Exit Zone, at which time, ZPA "Clear-To-Send" handshake messages percolate upstream from Zone to Zone, with Routing Slip messages sent in reply as the associated articles advance in lock-step.

What is claimed is:

1. A conveyor system comprising:
   at least one pair of motorized conveyor segments comprising rollers, belts, or bands for moving articles along a conveyor path;
   an article presence sensor located between each pair of consecutive motorized conveyor segments;
   a conveyor microcontroller controlling each motorized conveyor segment, the conveyor microcontroller being connected to two article presence sensors,
   one article presence sensor being located at the entry of the conveyor microcontroller's segment, and
   the other article presence sensor being located at the exit of the conveyor microcontroller's segment;
   a serial communication connection connecting the conveyor microcontrollers of each pair of consecutive motorized conveyor segments;
   an adapter connected to an industrial fieldbus network, the industrial fieldbus network allowing a barcode or a tag reader to signal individual article unique identities to the conveyor microcontroller;
   the barcode or tag reader being located at the conveyor system's terminus, junction segments, or both;
   the industrial fieldbus network further allowing a supervisory controller to be informed of article position and movement events, the supervisory controller controlling article routing motions at the conveyor system's terminus or junction segments; and the serial communication connection and supervisory controller forming a two-tier control system architecture;
   wherein the serial communication connection is one of the tiers and is private to the conveyor segment microcontrollers for article movement control messages.

2. The conveyor system of claim 1, further comprising serial communications between each conveyor microcontroller that are based on the absence or presence of an article in each conveyor microcontroller's segment and the next consecutive upstream segment from which a segment can receive an article being conveyed;
   the serial communications constituting permission to that upstream segment's conveyor microcontroller that indicates it is clear or not clear to send an article thereby permitting zero-pressure accumulation (ZPA) of articles.

3. The conveyor system of claim 2, further comprising speed scaling parameter bytes that are conveyed upstream, and a clear-to-send permission flag; the speed scaling parameter bytes and the clear-to-send permission flag creating a variable speed form of ZPA.

4. The conveyor system of claim 1, further comprising serial communications between an upstream conveyor microcontroller and a downstream conveyor microcontroller of the next consecutive downstream segment; the upstream conveyor microcontroller being able to send an article being conveyed to the next consecutive downstream segment; the serial communications containing the bytes of a unique Tag ID or Route Control; and the bytes directing the article's route at each junction of segments of diverging paths through which the article is to be conveyed based on decisions originating from a supervisory controller connected to the industrial fieldbus network at any time prior, the bytes being thereafter passed along with the article from segment microcontroller to segment microcontroller.

5. The conveyor system of claim 4, further comprising altering the Tag ID or Route Control bytes accompanying an article at any time during the article's progress along the conveyor system, and recording in those bytes which routing steps were obeyed and which were not.

6. The conveyor system of claim 4, further comprising employing any fixed-length format Tag ID or Route Control bytes containing one or more bytes per segment to assert the path sequence of the associated article.

* * * * *